United States Patent [19]
Prenger

[11] Patent Number: 5,942,171
[45] Date of Patent: Aug. 24, 1999

[54] METHOD FOR MANUFACTURING BIAXIALLY ORIENTED TUBING FROM THERMOPLASTIC MATERIAL

[75] Inventor: Jan Hendrik Prenger, Hardenberg, Netherlands

[73] Assignee: Wavin B.V., Zwolle, Netherlands

[21] Appl. No.: 08/732,331

[22] PCT Filed: May 3, 1995

[86] PCT No.: PCT/NL95/00160

§ 371 Date: Jan. 15, 1997

§ 102(e) Date: Jan. 15, 1997

[87] PCT Pub. No.: WO95/30533

PCT Pub. Date: Nov. 16, 1995

[30] Foreign Application Priority Data

May 4, 1994 [NL] Netherlands ............................ 9400738

[51] Int. Cl.[6] .................................................... B29C 7/30
[52] U.S. Cl. .................... 264/40.7; 264/209.5; 264/237; 425/325; 425/393
[58] Field of Search ................................ 264/40.7, 209.5, 264/237, 532, 573, 565; 425/325, 326.1, 393, 72.1

[56] References Cited

U.S. PATENT DOCUMENTS

| | | |
|---|---|---|
| Re. 31,133 | 1/1983 | Niessner et al. .......................... 264/541 |
| 3,274,314 | 9/1966 | Hudson et al. . |
| 3,784,345 | 1/1974 | Wissinger et al. ........................ 425/325 |
| 4,008,022 | 2/1977 | Carrico .................................... 425/72 R |
| 4,526,526 | 7/1985 | Krogh . |
| 4,749,531 | 6/1988 | Borger et al. ............................ 264/40.6 |
| 4,842,803 | 6/1989 | Bose et al. ................................ 264/565 |
| 5,096,634 | 3/1992 | Tsadares et al. ......................... 264/40.2 |
| 5,449,487 | 9/1995 | Jarvenkyla ................................ 264/508 |
| 5,785,906 | 7/1998 | Prenger et al. .......................... 264/40.1 |

FOREIGN PATENT DOCUMENTS

| | | |
|---|---|---|
| 0 371 769 A2 | 6/1990 | European Pat. Off. . |
| 0 454 997 A3 | 11/1991 | European Pat. Off. . |
| 41 29 881 A1 | 4/1993 | Germany . |
| WO 90/02644 | 3/1990 | WIPO . |

*Primary Examiner*—Jill L. Heitbrink
*Assistant Examiner*—Mark Eashoo
*Attorney, Agent, or Firm*—Blank Rome Comisky & McCauley LLP

[57] ABSTRACT

A tube is extruded from a thermoplastic material and is then forced over a mandrel at an orientation temperature of the material. The mandrel has an expanding section that expands the tube in its circumferential direction. A tube speed controller upstream of the expanding section of the mandrel exerts an axial force on the tube, and a puller downstream of the mandrel exerts an axial pulling force on the tube. Upstream of the tube speed controller, an outer layer of a wall of the tube is brought to a temperature below the orientation temperature. That outer layer is thick enough to withstand the force exerted by the tube speed controller.

5 Claims, 4 Drawing Sheets

METHOD FOR MANUFACTURING BIAXIALLY ORIENTED TUBING FROM THERMOPLASTIC MATERIAL

FIELD OF THE INVENTION

The present invention relates to a method for manufacturing biaxially oriented tubing from thermoplastic material according the the preamble of claim 1.

DESCRIPTION OF RELATED ART

In WO 93/19924 a method of making tubing is disclosed. The object of biaxial orientation of the plastic material of a tube, also known as biaxially stretching a tube, is to improve the properties of the tube through orientation of the molecules of the thermoplastic material in two mutually perpendicular directions; the axial direction and the hoop or circumferential direction.

In order to effect the biaxial orientation it is desired that the tube is, uniformly over the wall thickness of the tube, at the orientation temperature suitable for the thermoplastic material concerned. This has been disclosed in DE 23 57 210 and EP 0 441 142 (Petzetakis). In practice, this orientation temperature is the temperature at which the plastic material becomes form-retaining when it cools down. For PVC (polyvinylchloride) the orientation temperature lies in a range just above the glass transition temperature of PVC. PE (polyethylene) and other polyolefins exhibit no transition temperature, but an "alpha phase", which indicates the transition from a crystalline through a partially crystalline to an amorphous structure. The orientation temperature of such a plastic material lies just above the temperature range appertaining to the "alpha phase". The biaxial orientation is fixed (frozen) by cooling the tube.

To obtain the orientation temperature of the plastic material the tube which exits from the extruder at a high temperature is cooled. In practice, this cooling is achieved by passing the extruded tube through a cooling device placed downstream of the extruder, which device cools the tube externally and/or internally.

According to WO 93/19924 the extruded tube is passed through a constant temperature area before reaching the expanding section of the mandrel to obtain the desired homogeneous temperature of the tube before it is biaxially oriented. WO 93/19924 also proposes to place a pushing device in this area which has belts which grip the outside of the tube and push the tube towards the mandrel. This pushing device therefore acts as a tube speed controlling means. It is noted that most extruders allow the extrusion speed to be set at a desired value, but this possibility does not allow a control of the biaxial orientation process.

SUMMARY OF THE INVENTION

In the context of the present invention, the tube speed controlling means are separate means placed between the extruder and the expanding section of the mandrel.

The transmission of an axial force to a tube by the tube speed controlling means, without damaging the surface thereof upon which the tube speed controlling means engages (the inner and/or the outer surface of the hollow tube), will be based upon frictional forces between the tube speed controlling means and the tube.

It has been found that the axial force which can be transmitted by the tube speed controlling means to the tube with the known method is limited since the thermoplastic material of the tube has its orientation temperature as the tube speed controlling means acts upon the tube, and the tube is rather soft at that temperature. In order to exert an axial force on the tube the tube speed controlling means must apply a large radial force on the tube and due to the softness of the tube these forces would damage the tube, in particular at the locations where the tube speed controlling means grips the tube.

The object of the present invention is therefore to provide a method which allows a substantial axial force to be exerted by the tube speed controlling means on the extruded tube without the tube being damaged and without other detrimental consequences for the following biaxial orientation. It is a further object of the invention to provide a energy efficient method for the manufacturing of biaxially oriented tubing. Another object of the invention is to make it possible to manufacture biaxially oriented tubing in a continuous process in a precisely controllable manner.

The present invention provides a method, which is characterized in that upstream of the tube speed controlling means the plastic material in an outer layer of the wall of the tube, upon which layer the tube speed controlling means acts, is brought to a temperature which is below the orientation temperature, this layer being so thick that it can withstand the force exerted by the tube speed controlling means.

The present invention therefore proposes that the area of the tube on which the tube speed controlling means acts should have a cold, and consequently strong and hard outer layer, which is also referred to herein as a "skin". This the temperature and thickness of the skin should be such that it can withstand mechanical influences of the tube speed controlling means without being damaged. It has been found that the cold outer layer can be thin compared with the total thickness of the tube wall. The temperature of the outer layer required for achieving the necessary strength and hardness depends on the plastic material, but will in any case be clearly lower than the orientation temperature of the plastic material. For a plastic material like PVC, the glass transition temperature of which lies in the range between approximately 80 and 85° C., it is found that cooling of the extruded tube to a temperature of approximately 70° C. on the area of the tube upon which the tube speed controlling means acts is adequate for obtaining a sufficiently thick and strong outer layer. Other plastic materials exhibit no clear transition temperature for the strength properties of the material. In the case of PE and other polyolefins there is the abovementioned "alpha phase". In that case the outer layer needs to be cooled to just below the temperature range appertaining to the "alpha phase".

The skin is preferably formed by cooling this outer layer of the extruded tube to a lower temperature than the part of the wall of the tube not comprised in the outer layer. A suitable value for the temperature of the skin (or temperature range) is in any case below the orientation temperature of the plastic material concerned. The part of the wall of the tube not comprised in the outer layer or skin is at a higher temperature than the outer layer, preferably approximately the desired orientation temperature.

The hard skin will distribute a force applied locally on the tube over a larger surface area of the tube. Therefore it is now possible to exert forces on the tube which would otherwise damage the tube locally, e.g. apply a radial force which would otherwise lead to a depression or hole being formed in the tube.

A highly energy efficient method for producing biaxially oriented tubing is obtained when the heat content of the material not comprised in the cold layer is maintained such that the entire wall of the tube can reach the orientation temperature before it reaches the mandrel.

Preferably the tube speed controlling means acts upon the tube under deformation of the initial cross-section of the tube, which it has upstream from the tube speed controlling means. This measure according to the invention is based on the realization that it is allowed to deform the tube at this point since there is a certain period of time to restore the tube to its underformed shape before the tube reaches the mandrel.

The radial surface pressure created by the deformation of the tube by the tube speed controlling means makes it possible to exert a great axial force on the tube by the tube speed controlling means. The strong and hard outer layer increases the resistance to deformation of the tube, with the result that when the tube is deformed by the tube speed controlling means the surface pressure thereby produced is greater than it would be without the cold outer layer. The outer layer also prevents undesirable damage to the tube.

When a biaxially oriented cylindrical tube is being manufactured with the method of the present invention, which is the type of tube for which there will be the greatest demand in practice, the tube to be biaxially oriented comes out of the extruder in the form of a tube with a smooth cylindrical tube wall, which is then deformed through the tube speed controlling means acting upon the tube, for example to an oval shape by compresssing it radially. If the tube subsequently moves over a mandrel with an essentially round cross-section, the ultimately desired shape of tube is obtained. After it has passed over the mandrel, the diameter of the tube will decrease to the ultimately desired dimensions as the result of cooling (shrinkage) and the pulling force (constriction) exerted on the tube. For this reason the diameter of the mandrel will preferably be somewhat greater than the inner diameter of the tube to be manufactured.

The speed of the extruded tube is preferably controlled by tube speed controlling means which act upon the tube over a length thereof, the engagement of the tube speed controlling means with the tube being achieved by several active elements of said tube speed controlling means, which clamp the tube between them. A lower limit for the surface area with which the tube speed controlling means act upon the tube is formed by the maximum admissible surface pressure between the tube and the tube speed controlling means. Said surface pressure may not be so great that it can lead to damage to the tube.

The tube speed controlling means can comprise a plurality of driven endless tracks disposed around the circumference of the tube, each track engaging on a longitudinal strip of the tube. The parts of the tracks acting upon the tube need not fully enclose the tube in the circumferential direction, because the strong and hard outer layer distributes the radial and axial forces exerted by the tracks over a large surface area of the tube. This makes it possible to control the speed of the tube with devices which until now have been used in particular as pulling devices for tubular sections in the plastics industry.

The present invention also proposes cooling the tube internally after it has passed over the mandrel, in particular if the wall of the biaxially oriented tube is so thick that external cooling alone of the tube would lead to an undesirably long cooling section and undesirably slow cooling.

Further advantageous embodiments of the method according to the present invention are disclosed in the appended claims and the following description.

BRIEF DESCRIPTION OF DRAWINGS

The invention will be explained in greater detail below with reference to the drawing, in which.

DETAILED DESCRIPTION OF THE PREFERRED EMBODIMENT

FIGS. 1, 2, 3 and 4 are based on an application of the method according to the invention in which a tube made from thermoplastic material (such as PVC or PE) and having a smooth cylindrical wall is being manufactured. It will be clear that the inventive idea and solutions described here can also be used for manufacturing tubular sections with a different cross-section, if necessary by adapting the embodiment of the parts described herein.

Figure 1:
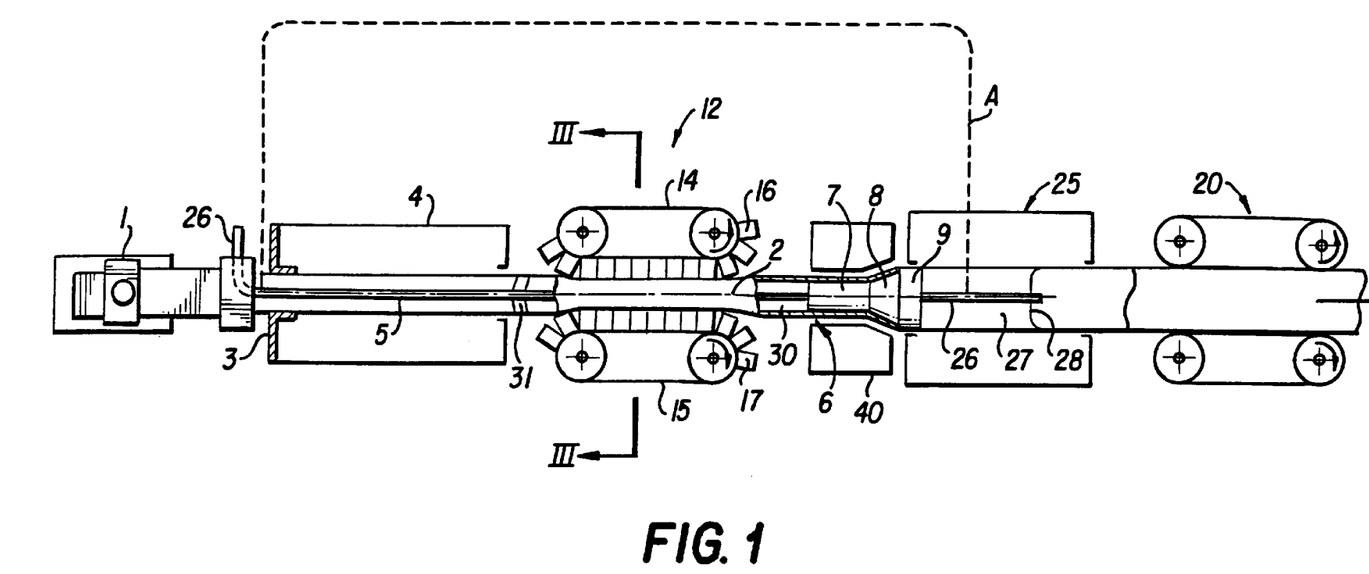
FIG. 1 shows diagrammatically in a top view, partially in section, an exemplary embodiment of a device according to the invention for manufacturing biaxially oriented tubing.

FIG. 1 shows an extruder 1 by means of which a hollow tube 2 made of thermoplastic material is manufactured in a continuous process. On leaving the extruder 1, the tube 2 has a round annular initial cross-section.

The tube 2 leaving the extruder 1, is passed through an external calibration sleeve 3 and subsequently through a cooling device 4, in this example a water cooling device.

The tube 2 is biaxially oriented by forcing the tube 2 at a suitable orientation temperature of the plastic material of the tube 2 over a mandrel 6 which is held in place by a tension member 5 passing through the hollow tube 2 and connected to the extruder 1.

In practice, this orientation temperature is the temperature at which the plastic material becomes form-retaining when it cools down. For PVC the orientation temperature lies in a range just above the glass transition temperature of PVC. PE and other polyolefins exhibit no transition temperature, but an "alpha phase", which indicates the transition from a crystalline through a partially crystalline to an amorphous structure. The orientation temperature of such a plastic material lies just above the temperature range appertaining to the "alpha phase".

The mandrel 6 has a cylindrical run-on section 7, an expanding section 8 having the form of a truncated cone, and an essentially cylindrical run-off section 9 which is tapered slightly towards the downstream end thereof.

For controlling the speed with which the tube 2 moves towards the mandrel 6, a tube speed controlling device 12 is present at a distance upstream of the upstream end of the mandrel 6, viewed in the direction of movement of the tube 2, which device 12 acts upon the outside of the tube 2.

The diagrammatically shown device 12 will be explained further below.

A pulling device 20 is present downstream of the mandrel 6, for exerting an axial pulling force on the tube 2. Said pulling device 20 can be of a design which is generally known in the prior art.

The forcing of the tube 2 over the mandrel 6 is not only effected by the pulling force exerted by the device 20 on the tube 2, but also by means of the device 12 which is in this case set to exert an axial pushing force towards the mandrel 6 on the tube 2. The object of the additional pushing force is to permit a reduction in the pulling force to be exerted by the device 20 on the tube 2. This is advantageous because the tearing strength of the tube 2—which is at the orientation temperature while passing over the mandrel 6, and is therefore viscous—constitutes a limitation for the pulling force to be exerted on the tube 2 by the device 20. A great degree of orientation in hoop direction, and consequently advantageous tube properties, can be achieved by this method.

According to the present invention the outside of the tube 2 upstream of the device 12 is cooled by the cooling device 4 in such a way that the plastic material in an outer layer adjoining the outside of the tube 2 is brought to a temperature which is clearly lower than the orientation temperature of the plastic material. This ensures that the wall of the tube 2 acquires a cold and therefore relatively strong and hard outer layer of a suitable thickness, so that this outer layer can withstand mechanical influences, caused in particular by the device 12 acting upon the tube 2. In other words, the present invention proposes providing the tube 2 with a hard "skin", by cooling the outer layer to a temperature which is lower than the orientation temperature desired for biaxial orientation when the tube is passing over the mandrel 6.

Figure 2:
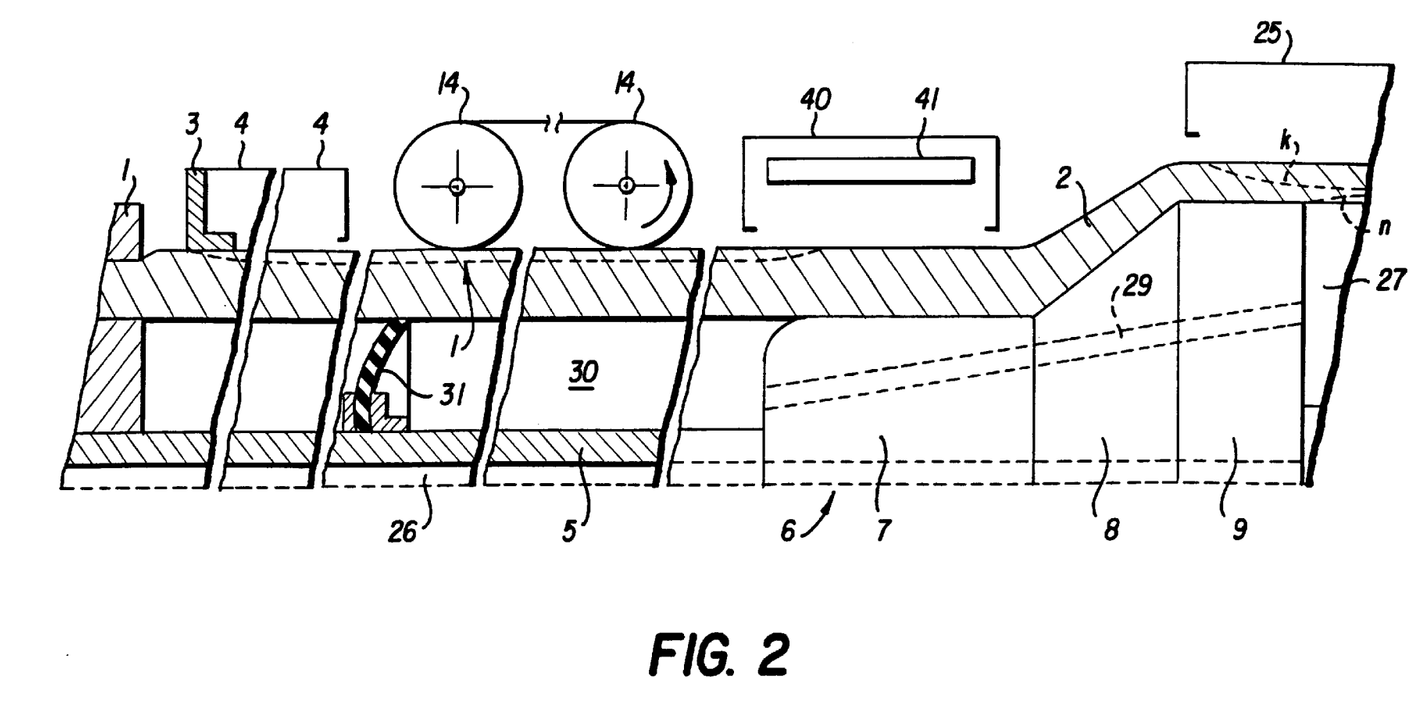
FIG. 2 shows a diagrammatic view, partially in section, of sections of detail A, which is shown by a dashed line in FIG. 1.

For a plastic material like PVC, the glass transition temperature of which lies in the range between approximately 80 and 85° C., it is found that cooling to approximately 70° C. on the outside of the tube is adequate for obtaining a sufficiently thick and strong outer layer. The temperature in the outer layer defined according to the present invention in the case of PVC therefore lies between 80° C. on the inside of the outer layer and 70° C. on the outside of the outer layer. In FIG. 2 the outer layer is indicated by the 80° C. isotherm shown by a dashed line "l" in the wall of the tube 2. Other plastic materials show no clear transition temperature for the strength properties of the material. In the case of PE there is an "alpha phase", which indicates the transition from a crystalline through a partially crystalline to an amorphous structure. The outer layer in this case should be cooled to just below the temperature range appertaining to the "alpha phase".

The hard skin produced according to the invention upstream of the device 12 around the warmer and softer wall material of the tube 2 prevents any risk of damage to the tube 2 by the device 12. Other advantages of the skin will be described further below.

Because the device 12 is spaced apart from the mandrel 6 a period of time is available to effect the reheating of the outer layer to the desired orientation temperature. During the time that the tube 2 moves from the device 12 to the mandrel 6 the plastic material enclosed by the outer layer, which material is at a higher temperature than the outer layer, gradually releases part of its heat to the colder outer layer. The result of this is that the outer layer defined according to the invention will gradually become thinner if the outside of the tube 2 is no longer cooled. This heating can ultimately lead to the disappearance of the outer layer defined according to the present invention. The temperature of the inner part of the tube wall is then preferably regulated in such a way, for example by internal cooling/heating of the tube 2, that at the moment when the tube leaves the device 12 said temperature is higher than the orientation temperature. As the heat of this inner part of the tube is partly transfered to the outer layer the inner part is cooled to the desired orientation temperature. This heat transfer from inside to outside means that the tube, including the outer layer, is at the orientation temperature desired for biaxial orientation when it is passed over the mandrel 6.

It can be seen in FIG. 2 that the thinning of the outer layer (line "l") begins immediately after leaving the cooling device 4. In order to ensure that a sufficiently strong outer layer remains present at least while the device 12 is being passed, the device 12 can be provided with a cooling system.

It can also be seen from the illustration in FIG. 2 that the cold outer layer of the tube 2 decreases further in thickness after leaving the device 12, through heating from the inside of the tube 2. In order to ensure that on reaching the expanding section 8 of the mandrel 6 the tube 2 is at the desired orientation temperature as uniformly as possibly, provision is made for a heating device 40 placed near the mandrel 6, which heating device will be explained below.

After passing over the expanding section 8 of the mandrel 6, the tube 2 is cooled on the outside by a diagrammatically indicated cooling device 25. In FIG. 2 this is shown by dashed line "k", which shows the 80° C. isotherm in the wall of the tube 2. The tube 2 is also cooled internally downstream of the mandrel 6 by supplying cooling liquid through a supply channel 26, extending partly through the tension member 5, to a space 27 which is bounded by the tube 2, the mandrel 6 and a sealing device 28. The sealing device 28 comprises a flexible disc which rests in a sealing manner against the inside of the tube 2. The influence of the internal cooling on the temperature of the tube 2 is indicated by line "n", which shows the 80° C. isotherm in the wall of the tube 2.

The cooling liquid supplied, which is heated in the space 27, leaves the space 27 through passage openings 29 (see FIG. 2) disposed in the mandrel 6, and subsequently passes into a space 30 upstream of the mandrel 6. The space 30 is bounded by the tube 2, the mandrel 6 and a sealing device 31. The sealing device 31 can also lie closer to the extruder 1, depending on the situation. The sealing device 31 in this example, like the sealing device 28, comprises one or more flexible discs resting in a sealing manner against the inside of the tube. The liquid leaves the space 30 through a discharge channel (not shown) in the tension member 5. The fact that the liquid flows through the inside of the mandrel 6 produces cooling of the mandrel 6. It is clear that individually adjustable liquid flows can also be supplied to the spaces 27 and 30. It is also possible to cool the mandrel 6 by means of a separate cooling liquid flow.

The device 12 used in this example comprises a frame, bearing two chains 14, 15 of rubber blocks 16, 17 respectively, which can be moved along a corresponding closed track. For the sake of clarity, only a number of pairs of the rubber blocks 16, 17 are shown. Each closed track has an active part in which the blocks 16, 17 belonging to the two chains 14, 15 act upon sectors of the outer circumference of the tube 2 situated on either side of the tube 2. The device 12 is designed in such a way that the distance between the blocks, and thus the passage for the tube 2 to be oriented, can be altered.

The way in which the device 12 acts upon the tube 2 will now be explained with reference to FIGS. 1 and 3.

Figure 3:
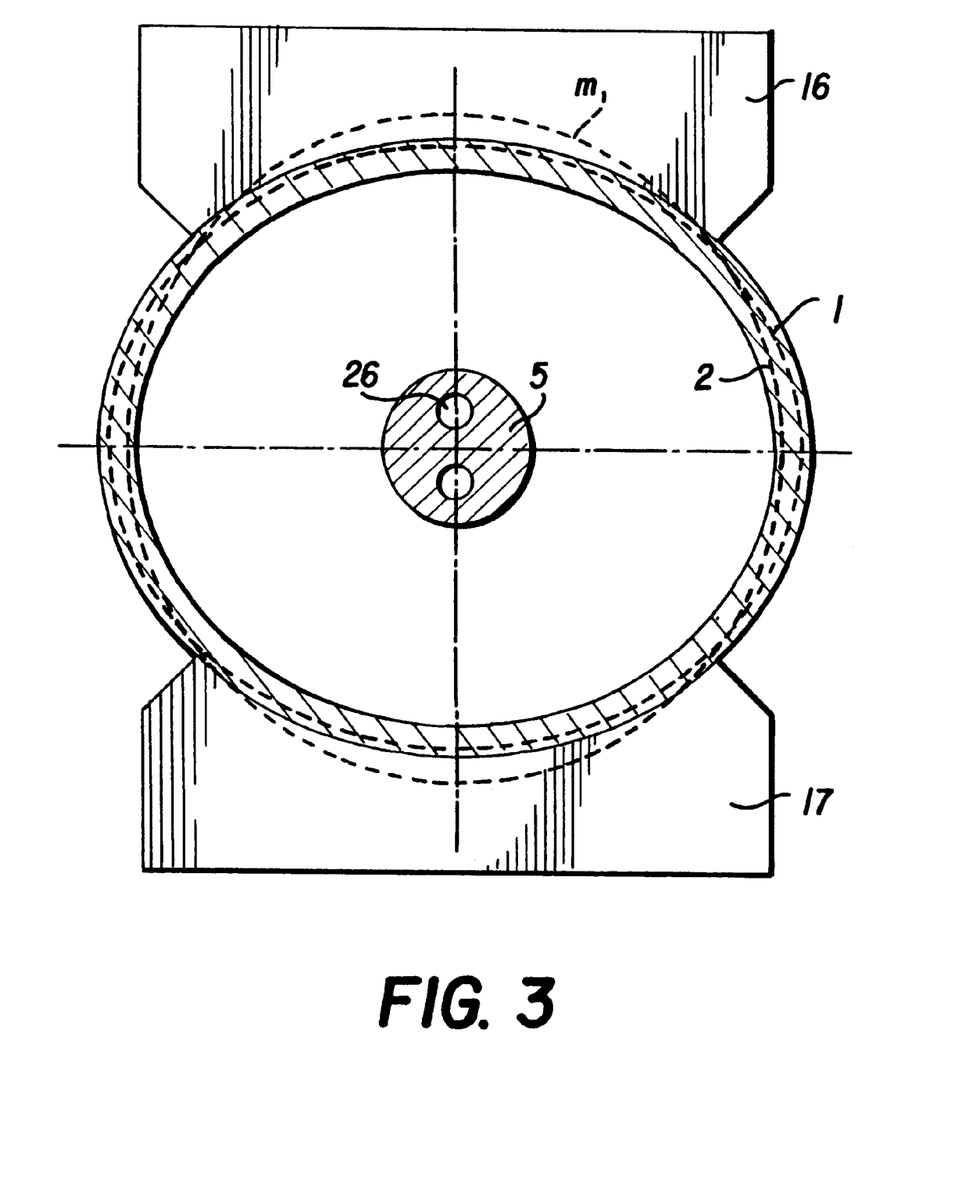
FIG. 3 shows diagrammatically a section along the line III—III in FIG. 1.

In the section of FIG. 3 a pair of blocks 16, 17 can be seen, belonging respectively to the chains 14, 15 of the pushing device 12 shown in FIG. 1. The blocks 16, 17 are shown in the position in which they are situated in the active part of the closed track along which they move. The tube 2, which has left the extruder 1, the calibration sleeve 3 and the cooling device 4 with a round initial cross-section, is compressed to a tube 2 with an oval cross-section through the blocks 16, 17 acting thereon. For a better understanding of the invention, the external circumference with round initial cross-section of tube 2 is shown in FIG. 3 by a dashed line. In FIG. 3 the inner boundary line of the cold outer layer of the tube 2 is also indicated by a dashed line. In this example the tube is made of PVC and the inner boundary line corresponds to the 80° C. isotherm (dashed line "l").

As a reaction to the deformation of the tube 2 brought along by the device 12, a surface pressure (normal force) is created between the tube 2 and the blocks 16, 17 of the device 12. Said surface pressure is the result of the resistance of the tube 2 to the imposed deformation; it is clear that the strong outer layer makes an important contribution to the overall deformation resistance of the tube 2. With the same deformation, the presence of the outer layer thus leads to a greater surface pressure than if there were no outer layer. The greater surface pressure makes it possible to exert a greater axial force on the smooth tube 2.

The surface pressure between the blocks 16, 17 and the tube 2 can therefore be regulated by regulating the passage between the chains 14, 15. Moreover, tubes of mutually differing diameters can be handled without major adjustments being made to the device 12. The device 12 can be provided with temperature-regulating means for regulating the temperature of the blocks 16, 17. For example, it may be desirable to cool the blocks 16, 17, in order in this way to prevent premature heating of the cold outer layer of the tube 2.

The tube 2 is then moved over the mandrel 6, which has a round cross-section corresponding to the tube to be manufactured. The deformation of the tube 2 caused by the device 12 is allowable because the biaxial orientation of the molecules of the thermoplastic material occurring at the mandrel 6 is essentially the determining factor for the properties of the ultimately manufactured tube 2.

It can be seen in FIG. 1 that the blocks 16, 17 of the device 12 act upon the tube 2 at a distance upstream of the upstream end the mandrel 6. The tension member 5 is also made so thin that the tube 2 cannot come into contact internally with the tension member 5 at the place where these blocks 16, 17 act upon the tube 2 and compress the tube 2. The risk of the tube 2 becoming jammed between the blocks 16, 17 and the tension member 5 is thus avoided.

The distance between the point where the blocks 16, 17 act upon the tube 2 and the expanding section 8 of the mandrel 6, preferably 5–10 times the tube diameter at this point, is advantageous for the abovementioned heating of the outer layer from the inside. Furthermore, a relatively large distance between the device 12 and the expanding section of the mandrel 6 leads to a damping of any pulsations which may occur in the axial force exerted by the device 12. In conjunction with the hard outer layer, the state of stress of the wall material of the tube 2 at the position of the mandrel 6 remains very constant. This is not only advantageous for controlling the biaxial orientation process, but in particular prevents undesirable wrinkling in the wall thickness from occurring in the axial direction of the manufactured tube 2.

In the care of the method according to the present invention the suitable distance between the device 12 and the expanding section of the mandrel 6 will have to be determined for each individual situation. Various parameters, for example the dimensions of the tube, the degree of deformation in the circumferential direction of the tube while it is passing over the expanding section of the mandrel, the envisaged axial force exerted by the tube speed controlling means, and the properties of the plastic material of the tube, will be found to be important.

The distance between the device 12 and the mandrel 6 also has the advantage that the tube 2 undergoes a gradual transition from the deformed oval cross-section at the device 12 to the cross-section at the mandrel 6.

Between the device 12 and the expanding section 8 of the mandrel 6, the tube 2 is subjected to an axial pressure load by the device 12 when the device 12 exerts a pushing force. In combination with the envisaged distance between the device 12 and the expanding section of the mandrel 6 the tube 2 will have the tendency to buckle. The risk of buckling is limited in the case of the method according to the invention by the strong outer layer (skin) of the tube 2, which does, however, become increasingly thin further away from the device 12, due to the heating of the outer layer. Therefore the tube 2 is preferably supported in the lateral direction in the region between the device 12 and the expanding section of the mandrel 6. The tube 2 need not be supported over the entire distance here, and it can be supported either on the inside or on the outside. The tube 2 is advantageously supported by a run-on section of the mandrel placed upstream of the expanding section of the mandrel. This run-on section then forms an internal support for the tube near the expanding section of the mandrel. If a suitable length is selected for the run-on section, buckling can be prevented over the entire distance between the device 12 and the expanding section of the mandrel.

In FIG. 1 it can be seen that the mandrel 6 is provided with a cylindrical run-on section 7, which section is placed upstream of the expanding section 8 of the mandrel 6 and is integral therewith. Said run-on section 7 then forms an internal support for the tube 2 and has for example a length of at least three times the tube diameter. Buckling of the tube 2 is prevented near the device 12 by the strong outer layer still present there, and is prevented near the mandrel 6 by the run-on section 7 of the mandrel 6.

The axial pressure to which the tube 2 is subjected in this case also leads to upsetting of the tube 2. The result of this is that the cross-section of the tube 2 upstream of the mandrel 6 will be slightly larger, generally a few per cent (1–5%) than upstream of the device 12. For accurate guidance of the tube 2 relative to the mandrel 6, it is desirable for the tube 2 to be centered before the expanding section 8 of the mandrel 6. This is achieved through the fact that, when the diameter of the run-on section 7 is being determined, the increase in the internal diameter of the tube 2 as a result of the upsetting effect is taken into account. An advantageous effect of the upsetting of the tube 2 is that it also causes a greater surface pressure between the blocks 16, 17 of the device 12 and the tube.

Although a heating of the cold outer skin is effected by heat transfer from the inside of the tube 2, a controlled heating of the tube 2 between the device 12 and the expanding section of the mandrel is preferred to be able to insure that the plastic material of the tube wall is at the orientation temperature when passing over the mandrel 6. On the basis of the abovementioned automatic heating of the outer layer from the inside, reaching the orientation temperature uniformly could not always be guaranteed with certainty.

It is preferred that heating of the tube comprises influencing the temperature of the plastic material of the tube by a system which is adjustable sector-wise in the circumferential direction of the tube. The sector-wise adjustment of the heating is preferably carried out depending on the measured cross-section profile of the biaxially oriented tube. This measure is based on the following idea:

While the tube is passing over the mandrel the plastic material of the tube encounters a resistance which counteracts the movement of the tube over said mandrel. This resistance depends on several parameters, such as the temperature of the plastic material, the wall thickness of the tube upstream of the mandrel, the friction between the tube and the mandrel, and the shape of the mandrel. Since the plastic material is in a readily deformable state while it is passing over the mandrel, the distribution of the plastic material around the mandrel will therefore be influenced by differences in resistance to the movement of the tube over the mandrel seen in the circumferential direction of the tube. This can lead to differences in the wall thickness of the tube, viewed in a cross-section at right angles to the axis of the mandrel, when the tube is leaving the mandrel. In the sector of the tube where there is a variation in the wall thickness the biaxial orientation obtained will also not correspond to that in the other circumferential sectors of the tube. Any influence which the tube speed controlling means may have on the homogeneity of the tube can also be compensated for by this measure according to the invention.

This method of influencing the resistance by means of the temperature of the tube wall can be achieved in a simple way in practice, and can be carried out from the outside of the tube or also, possibly in combination, from the inside of the tube. Through a local rise in the temperature, the plastic material of the tube will flow more easily at that point under the load which occurs. So this in fact influences the resistance encountered by the tube when it is passing over the mandrel. Likewise, through a local change in the temperature of the plastic material on the inside of the tube, an influence can be exerted on the friction resistance between that part of the tube and the mandrel. In this case the mandrel can be provided with individually adjustable heating units disposed around the circumference of the mandrel.

The heating device 40 in this example comprises eight infrared heating units 41, which are placed near the mandrel 6 at regular intervals around the path where the tube 2 passes through the device 40. Each unit 41 can supply an adjustable quantity of heat to the tube 2. The infrared heating units 41 are set up in such a way that each of them can exert influence on the temperature of the plastic material of the tube 2 in a sector of the circumference of the tube 2. The heating device 40 designed in this way can be used to bring the tube 2 accurately to the temperature desired for the biaxial orientation.

With the heating device 40, sector-wise influencing of the resistance encountered by the tube 2 when it is passing over the mandrel 6 is also possible, as explained earlier.

Figure 4:
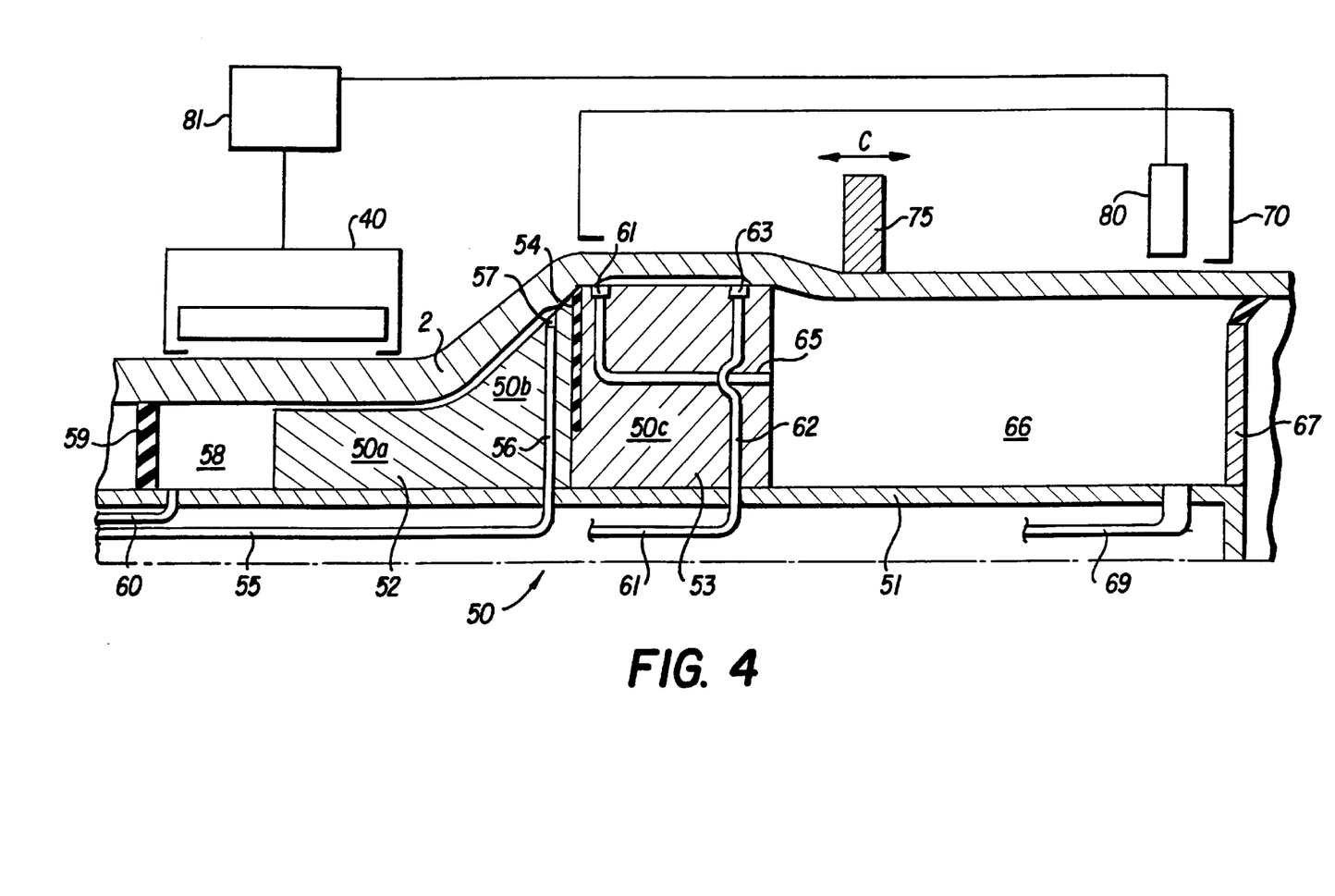
FIG. 4 shows diagrammatically, in a half longitudinal cross-section, a part of a device for manufacturing biaxially oriented tubing using a preferred embodiment of the mandrel.

FIG. 4 shows diagrammatically in sectional view a part of the production line of FIG. 1 wherein the biaxial orientation of the tube 2 is effected. An important difference with the production line shown in FIG. 1 is the alternative embodiment of the mandrel, which is indicated with reference numeral 50 in FIG. 4.

As in FIG. 1 the mandrel 50 is connected to the extruder (not shown) with a tension member 51. The mandrel 50 consists essentially of two sections; a heated section 52 which comprises an essentially cylindrical run-on section 50a and a conical expanding section 50b and a cooled section 53 which comprises an essentially cylindrical run-off section 50c.

A ring-shaped disc 54 of a thermal insulating material, such as a plastic, is placed between the heated section 52 and the cooled section 53 of the mandrel 50.

A warm fluid, e.g. warm water, is fed through a conduit 55 in the tension member 51 to one of more channels 56 provided in the essentially solid metal mandrel section 52. Each channel 56 ends in a recessed circumferential groove 57 provided in the outer conical surface of mandrel section 52. The fluid supplied through conduit 55 forms a layer between the tube 2 and the heated section 52 of the mandrel 50 and will flow from this groove 57 against the direction of movement of the tube 2. The warm fluid then flows into an annular chamber 58 which is defined by a sealing device 59, the tube 2 and mandrel section 52. Finally the fluid leaves the chamber 58 via a further conduit 60 provided in the tension member 51. The warm fluid will flow not in the same direction as the moving tube 2 since an effective fluid seal is established by the contact pressure between the tube 2 and the mandrel 50 downstream of the groove 57 in the area of the transition between the conical section 52 and the run-off section 53 of the mandrel 50.

In case of the biaxial orientation of a tube made of PVC the preferred temperature of the warm fluid is about 95° C., the pressure of the fluid is preferably no more than is necessary to form and maintain the fluid layer between the tube 2 and the heated mandrel section 52.

A cold fluid, e.g. cold water, is fed through a conduit 61 in the tension member 51 to one or more channels 62 provided in the essentially solid metal mandrel section 53. Each channel 62 opens in a recessed circumferential groove 63 provided in the outer surface of section 53. The fluid will flow from this groove 63, against the direction of movement of the tube 2, towards a second circumferential groove 64 provided in the outer surface of the mandrel section 53, and flows from there via one or more channels 65 to a chamber 66 downstream of the mandrel 50. A layer of fluid is hereby established between the cooled section 53 of the mandrel 50 and the tube 2. The chamber 66 is defined by a sealing device 67, the part of the tension member 51 extending downstream from the mandrel 50, and the mandrel section 53. The fluid entering the chamber 66 will leave this chamber 66 via a conduit 69 provided in the tension member 51.

The groove 63 is spaced such a distance from the downstream end of mandrel section 53 that an effective fluid sealing is established by the contact pressure between the tube 2 and mandrel section 53. This pressure is mainly a result of the tendency of the tube 2 to shrink as the tube is cooled down. The flow of cold fluid between the run-off section 53 of the mandrel 50 and the tube 2 cools the tube 2 from the inside immediately after the radial expansion of the tube 2 has been effected. In case of the biaxial orientation of PVC the temperature of the cold fluid is preferably about 20° C. when fed into the conduit 61.

It is noted that the thickness of the fluid layers between the tube 2 and the sections 52 and 53 of the mandrel 50 is exagerated in FIG. 4.

As is clear form the above and from FIG. 4 the tube 2 is only in contact with the mandrel 50 in the area between the groove 57 on the conical section and the groove 64 on the run-off section and in the area between groove 63 and the downstream end of the run-off section. The total area of contact is therefore considerably smaller than with the mandrel of FIG. 1. and the friction between the mandrel and the tube is greatly reduced. Due to this reduced friction the phenomenon can be observed that the pulling force exerted by the pulling device 20 (FIG. 1) on the tube 2 downstream of the mandrel 50 is not completely dissipated by the expansion of the tube 2 and frictional forces occurring at the mandrel 50, but there still is a residual pulling force on the tube 2 upstream of the mandrel 50. This would result in the tube 2 being pulled from the extruder 1 at a greater speed than intended and eventually the tube 2 could rupture. To eliminate this undesirable effect the tube speed controlling means 12 (FIG. 1) placed between the extruder 1 and the mandrel 50 are in this case set to exert an axial braking force on the tube 2, i.e. an axial force directed away from the mandrel 50. This braking force can be obtained by having the tracks 14, 15 of the tube speed controlling means 12 moving in the direction of movement of the tube 2 at a predetermined constant speed. Without the tube speed controlling means 12 actually braking the tube 2 it can be observed that, using a mandrel 50 of the type shown in FIG. 4, the tube 2 does not become stretched in the axial direction thereof, or at least not in a sufficient manner.

Therefore a balance has to be established between the pulling force exerted on the tube by the pulling device 20 downstream of the mandrel 50 and the axial force exerted by the tube speed controlling means upstream of the mandrel. This balance is obtained by regulating the speed of both devices.

Also the area of contact between the tube 2 and the mandrel 50 according to the present invention can be made adjustable to allow control the frictional forces between the mandrel 50 and the tube 2. This can be done either by having a plurality of mandrels with differing locations of the grooves on the outer surface of the mandrel or by providing a mandrel with valve means that allow the fluid to exit from one or more selected grooves on the outer surface of the mandrel.

During start-up of the production line shown in FIG. 1 but provided with the mandrel of the type shown in FIG. 4 it is obvious that no fluid layer can be formed between the tube 2 and the mandrel 50 and that the pulling device 20 downstream of the mandrel 50 cannot aid the forcing of the tube 2 over the mandrel 50. During the start-up procedure the tube speed controlling means 12 are then advantageously set to exert a pushing force, towards the mandrel 50, on the tube 2. To be able to exert a significant pushing force on the tube 2 the cooling device 4 is already in operation to form the cold outer skin on the tube 2 as disclosed hereinbefore.

The presence of a fluid film between the mandrel 50 and the tube 2 in a process for the manufacture of biaxially oriented tubing has already been disclosed in DE 23 57 210. In this document the fluid is introduced between the hollow plastic tube and the run-on section of the mandrel upstream from the expanding section of the mandrel. This fluid is to be dragged along by the moving tube over the mandrel. In DE 23 57 210 it is noted that the angle of the conical expanding section is limited to prevent the fluid film from being disrupted.

According to a preferred embodiment of the present invention the fluid is supplied between the tube and the mandrel through channels formed in the mandrel and opening on the outer surface of the mandrel, in particular on the expanding section and the run-off section thereof. This allows a far greater angle of the expanding section than with the method and mandrel of DE 23 57 210. The inventive design of the mandrel and manner of providing the fluid layer can therefore also be used to improve this known method without the forming of the cold outer skin on the extruded tube.

Another phenomenon that can be observed is that, due to the axial tensile forces present in the tube 2 between the device 12 and the mandrel 50, the tube 2 tends to contract in radial direction. This effect is counteracted by the cold outer skin of the tube 2, but also the device 12 could be provided with biasing means which bias the blocks 16 and 17 towards the tube 2 to maintain a sufficient radial contact pressure between the blocks 16, 17 and the tube 2.

To obtain a stable thickness of the fluid layer between the mandrel section 53 and the tube 2 a volumetric pump, i.e. a pump having a constant output independent from the fluid pressure, is preferably used to circulate the fluid. A similar type of pump is preferably used to circulate the warm fluid which forms a fluid layer between the tube 2 and mandrel section 52.

As can be seen in FIG. 4 the tube 2 is also cooled externally after the orientation in circumferential direction has been effected. A cooling device 70 is provided to achieve this external cooling.

A plate 75 having a calibrating opening where the tube 2 passes through is provided downstream of the mandrel 50. The plate 75 is movable with respect to the mandrel 50 as is indicated by arrow C in FIG. 4. Downstream of the plate 75 a measuring device 80 is located, which device 80 can determine the wall thickness and shape of the cross-section of the tube 2 passing through the device 80. The signal representing the measurements of the device 80 are fed into a control device 81, which compares this signal with a signal representing the desired tube dimensions. On the basis of this comparison the position of the plate 75 with respect to the mandrel 50 can be controlled. The same comparison is also used to control the working of the heating device 40 which has been described above referring to FIG. 1.

I claim:

1. Method for manufacturing biaxially oriented thermoplastic tubing, comprising the steps of:

extruding a tube having a wall of thermoplastic material, cooling said extruded tube by a first cooling device, and subsequently forcing said tube over an essentially solid mandrel when said wall of said tube is at an orientation temperature of the thermoplastic material, wherein a tube speed controlling means acts upon said tube upstream of the expanding section of the mandrel for exerting an axial force on the tube and a pulling means acts upon the tube downstream of the mandrel for exerting an axial pulling force on the tube, said mandrel comprising an expanding section which produces expansion in the circumferential direction of the tube and a run-off section downstream of said expanding section, said expanding section and said run-off section each having an outer surface, wherein said tube is cooled after passing over said expanding section of said mandrel by a second cooling device, and wherein said cooling of said extruded tube by said first cooling device is such that upstream of the tube speed controlling means the thermoplastic material in an outer layer of the wall of the tube, upon which outer layer the tube speed controlling means acts, is brought to a temperature which is below said orientation temperature, this layer being so thick that it can withstand a force exerted by the tube speed controlling means;

wherein a first fluid layer is formed between said tube and said expanding section of the mandrel by supplying fluid through channels in the mandrel which open in the outer surface of the expanding section of the mandrel, and wherein a second fluid layer is formed between the tube and the run-off section of the mandrel by supplying fluid through channels in the mandrel which open in the outer surface of the run-off section of the mandrel, and wherein an effective fluid seal is established between the first fluid layer and the second fluid layer by contact between the tube and the mandrel.

2. Method according to claim 1, wherein said fluid supplied to the outer surface of the expanding section of the mandrel is warm and wherein said fluid supplied to the outer surface of the run-off section is cold.

3. Method according to claim 1, wherein said supply of fluid to the outer surface of the expanding section of the mandrel is controlled to influence the location of said first fluid layer.

4. Method according to claim 1, wherein said tube is cooled internally downstream of said expanding section of the mandrel.

5. Method according to claim 1, wherein each of the first and second fluid layers is a fluid film.

* * * * *